US007929630B2

(12) United States Patent
Okunev

(10) Patent No.: US 7,929,630 B2
(45) Date of Patent: Apr. 19, 2011

(54) ADAPTIVE RFID RECEIVER FOR QAM SIGNALS

(75) Inventor: Yuri Okunev, Middle Island, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1181 days.

(21) Appl. No.: 11/518,212

(22) Filed: Sep. 11, 2006

(65) Prior Publication Data
US 2008/0063102 A1 Mar. 13, 2008

(51) Int. Cl.
*H04L 5/12* (2006.01)
(52) U.S. Cl. ............... 375/261; 375/260; 375/259
(58) Field of Classification Search .............. 375/261
See application file for complete search history.

(56) References Cited

U.S. PATENT DOCUMENTS

| 4,174,489 A * | 11/1979 | Guidoux et al. .............. 375/332 |
| 5,867,538 A * | 2/1999 | Liu .............................. 375/341 |
| 5,995,019 A | 11/1999 | Chieu et al. |
| 6,107,910 A | 8/2000 | Nysen |
| 6,278,746 B1 * | 8/2001 | Velez et al. .................... 375/326 |
| 6,360,369 B1 * | 3/2002 | Mahoney ........................ 725/111 |
| 6,433,671 B1 | 8/2002 | Nysen |
| 6,531,957 B1 | 3/2003 | Nysen |
| 6,580,358 B1 * | 6/2003 | Nysen ........................ 340/10.41 |
| 6,950,009 B1 | 9/2005 | Nysen |
| 7,286,614 B2 * | 10/2007 | Goldstein et al. .............. 375/316 |
| 2004/0114692 A1 * | 6/2004 | Matsumoto ................... 375/264 |
| 2005/0075103 A1 * | 4/2005 | Hikokubo et al. ............ 455/423 |
| 2005/0185743 A1 * | 8/2005 | Li .............................. 375/350 |
| 2006/0198449 A1 * | 9/2006 | De Bart et al. ................. 375/260 |
| 2006/0206290 A1 * | 9/2006 | Shin et al. ....................... 702/189 |
| 2006/0280267 A1 * | 12/2006 | Lui et al. ....................... 375/345 |
| 2006/0291591 A1 * | 12/2006 | Ghosh ........................... 375/340 |
| 2007/0297534 A1 * | 12/2007 | Okunev ........................ 375/316 |

FOREIGN PATENT DOCUMENTS

FR 2 783 121 3/2000

OTHER PUBLICATIONS

International Search Report and Written Opinion for International Appl. No. PCT/US2007/018582, dated Jan. 29, 2008, 12 pages.
Specification for RFID Air Interface: EPC™ Radio-Frequency Identity Protocols Class-1 Generation-2 UHF RFID Protocol for Communications at 860 MHz—960 MHz: Version 1.0.7, EPCglobal Inc., 93 pages (2004).
Okunev, Yuri, Phase and Phase-Difference Modulation in digital communications, Section 1.5, Artech House, Boston-London, ISBN No. 0-89006-937-9, pp. 36-46 (1997).

* cited by examiner

*Primary Examiner* — Chieh M Fan
*Assistant Examiner* — Santiago Garcia
(74) *Attorney, Agent, or Firm* — Glenn Frankenberger

(57) ABSTRACT

The present invention provides methods and apparatuses for demodulation and decoding of backscattered 16-QAM RFID tag signals, represented by their in-phase and quadrature components at the output of the demodulator in the receiver portion of a reader interrogator. In a communication channel with fast changing parameters, a reader receiver adaptively and coherently corrects the in-phase and quadrature-phase components of a signal received from a tag by tracking the phase and amplitude of the signal based on a decision-feedback. A reference signal is used to correct the signal components, where the coordinates of the reference signal is updated by a tracking and an averaging algorithm. A simple implementation of the receiver in a digital signal processing environment is enabled.

27 Claims, 9 Drawing Sheets

TABLE I: MAPPING CODE FOR 16-QAM CONSTELLATION

| 1 | 2 | 3 |
|---|---|---|
| Constellation Point Index | Mapping Code | Set of nearest points |
| 1 | 1100 | (2,4,5,13) |
| 2 | 1101 | (1,3,16) |
| 3 | 1111 | (2,4) |
| 4 | 1110 | (1,3,6) |
| 5 | 1000 | (1,6,8,9) |
| 6 | 1010 | (4,5,7) |
| 7 | 1011 | (6,8) |
| 8 | 1001 | (5,7,10) |
| 9 | 0000 | (5,10,12,13) |
| 10 | 0001 | (8,9,11) |
| 11 | 0011 | (10,12) |
| 12 | 0010 | (9,11,14) |
| 13 | 0100 | (1,9,14,16) |
| 14 | 0110 | (12,13,15) |
| 15 | 0111 | (14,16) |
| 16 | 0101 | (2,13,15) |

FIG. 3

TABLE II: DECISION-MAKING ALGORITHM

| 1 | 2 | | | | 3 | 4 | 5 | 6 |
|---|---|---|---|---|---|---|---|---|
| Constellation Point Index | Mapping Code | | | | Sign of $Q_{icor}$ | Sign of $I_{icor}$ | $\|Q_{icor}\| > 2$ | $\|I_{icor}\| > 2$ |
| | $b_1$ | $b_2$ | $b_3$ | $b_4$ | | | | |
| 1 | 1 | 1 | 0 | 0 | + | + | No | No |
| 2 | 1 | 1 | 0 | 1 | + | + | No | Yes |
| 3 | 1 | 1 | 1 | 1 | + | + | Yes | Yes |
| 4 | 1 | 1 | 1 | 0 | + | + | Yes | No |
| 5 | 1 | 0 | 0 | 0 | + | - | No | No |
| 6 | 1 | 0 | 1 | 0 | + | - | Yes | No |
| 7 | 1 | 0 | 1 | 1 | + | - | Yes | Yes |
| 8 | 1 | 0 | 0 | 1 | + | - | No | Yes |
| 9 | 0 | 0 | 0 | 0 | - | - | No | No |
| 10 | 0 | 0 | 0 | 1 | - | - | No | Yes |
| 11 | 0 | 0 | 1 | 1 | - | - | Yes | Yes |
| 12 | 0 | 0 | 1 | 0 | - | - | Yes | No |
| 13 | 0 | 1 | 0 | 0 | - | + | No | No |
| 14 | 0 | 1 | 1 | 0 | - | + | Yes | No |
| 15 | 0 | 1 | 1 | 1 | - | + | Yes | Yes |
| 16 | 0 | 1 | 0 | 1 | - | + | No | Yes |

FIG. 7

TABLE III: Transformation Table for the Tracking Algorithm

| 1 | 2 | 3 |
|---|---|---|
| Decision Index | $I_{ir}$ | $Q_{ir}$ |
| 1 | $(I_i+Q_i)/2$ | $(Q_i - I_i)/2$ |
| 2 | $0.3I_i+0.1Q_i$ | $0.3Q_i - 0.1I_i$ |
| 3 | $(I_i+Q_i)/6$ | $(Q_i - I_i)/6$ |
| 4 | $0.1I_i+0.3Q_i$ | $0.1Q_i - 0.3I_i$ |
| 5 | $(Q_i - I_i)/2$ | $-(I_i+Q_i)/2$ |
| 6 | $0.3Q_i - 0.1I_i$ | $-0.3I_i-0.1Q_i$ |
| 7 | $(Q_i - I_i)/6$ | $-(I_i+Q_i)/6$ |
| 8 | $0.1Q_i-0.3I_i$ | $-0.3Q_i-0.1I_i$ |
| 9 | $-(Q_i +I_i)/2$ | $(I_i -Q_i)/2$ |
| 10 | $-0.1Q_i-0.3I_i$ | $0.1I_i-0.3Q_i$ |
| 11 | $-(Q_i + I_i)/6$ | $(I_i -Q_i)/6$ |
| 12 | $-0.1 I_i - 0.3Q_i$ | $0.3 I_i - 0.1 Q_i$ |
| 13 | $(I_i - Q_i)/2$ | $(I_i + Q_i)/2$ |
| 14 | $0.1 I_i - 0.3Q_i$ | $0.3 I_i +0.1Q_i$ |
| 15 | $(I_i - Q_i)/6$ | $(I_i + Q_i)/6$ |
| 16 | $0.3 I_i-0.1Q_i$ | $0.1 I_i+0.3Q_i$ |

FIG. 9

ADAPTIVE RFID RECEIVER FOR QAM SIGNALS

BACKGROUND OF THE INVENTION

1. Field of the Invention

The present invention relates to telecommunications systems, including wireless telecommunications systems which implement data transmission via radio channels. More specifically, the invention relates to Radio Frequency Identification (RFID) systems and methods for data transmission between RFID tags and RFID reader interrogators.

2. State of the Art

Wireless communications technology has been showing a continuous strong trend to utilize multi-position Phase Shift Keying (PSK) and Quadrature Amplitude Modulation (QAM) techniques. A majority of wireless systems are based on modulation techniques such as Binary Phase Shift Keying (BPSK), Quadrature Phase Shift Keying (QPSK), 16-QAM, and 64-QAM. These modulation techniques are standardized for current and future mobile and fixed wireless systems including IEEE 802.16 standard systems for fixed, portable, mobile broadband wireless access. The most popular techniques are QPSK and 16-QAM. The 16-QAM modulation technique is based on a 16-point constellation located at the nodes of a square array.

16-QAM signal modulation is considered one of the most promising candidates for future RFID systems, which aim to achieve a considerable increase in data rate. The quest for providing a higher bit rate has already been realized to some extent in the $2^{nd}$ generation (Gen 2 or G2) RFID specification. Considerable advancement in the RFID tag design has also opened up new opportunities for data rate improvement based on utilization of QAM signals. However, QAM signal processing in RFID receivers needs further improvement.

Receivers used in G2 systems as well as the previous first Generation (Gen 1 or G1) systems have restricted ability for data rate improvement because both systems utilize binary signals with amplitude modulation only. It has been established that coherent signal processing, where both amplitude and phase are modulated, provides a considerable energy gain compared to non-coherent processing in the case of multiposition QAM modulation. During a data session in RFID channels with fast changing parameters, coherent signal processing requires continuous phase and amplitude adjustment. These adjustments include initial phase and amplitude estimation during the transmission of a signal preamble, and phase and amplitude tracking during data transmission. Present methods of carrier recovery work well for PSK modulation, but are not efficient for QAM because of the difficulties involved in demodulating an amplitude keying signal.

Many of the present demodulation or carrier recovery schemes for QAM signals are based on a process flow which does not utilize any feedback. Furthermore, many of the present implementations rely on relatively complicated decision circuitry.

Thus, what is needed are methods and apparatuses for further improvement of RFID QAM based readers configured for base-band processing of signal constellations.

SUMMARY OF THE INVENTION

Methods, systems, and apparatuses for the operation and implementation of RFID reader interrogators capable of demodulating and decoding QAM encoded backscattered signals from RFID tags are described.

In an aspect, in a communication channel with fast changing parameters, a reader receiver adaptively and coherently corrects the in-phase and quadrature-phase components (denoted as I and Q respectively) of a signal received from a tag by tracking the phase and amplitude of the signal based on a decision-feedback. A reference signal is used to correct the signal components, where the coordinates of the reference signal are updated by a tracking and averaging algorithm.

In an aspect of the present invention, a corrected received signal is used for making a decision using a simple decision algorithm based on comparing the corrected quadrature components with respect to multiple predetermined thresholds. Furthermore, a computed decision index is used to transform the current received signal into an updated reference signal based on a tracking and averaging algorithm. Updated coordinates of the averaged reference vector are used for the next correction of the received signal.

One or more advantages are realized when demodulating and decoding the backscattered tag signal according to an embodiment of the present invention. In a first example aspect, considerable energy gain as compared to conventional receivers is provided because coherent signal processing is adopted In another example aspect, a simple implementation of the receiver in a digital signal processing (DSP) environment is enabled.

These and other aspects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3 shows a table showing the mapping code for the 16-QAM constellation diagram in FIG. 2.

FIG. 7 shows a table showing a decision-making algorithm according to an embodiment of the present invention.

FIG. 9 shows a transformation table used for a tracking algorithm, according to an embodiment of the present invention.

The present invention will now be described with reference to the accompanying drawings. In the drawings, like reference numbers indicate identical or functionally similar ele-

DETAILED DESCRIPTION OF THE INVENTION

A. Introduction

The present invention relates to wireless telecommunications apparatus, systems and methods which implement data transmission via radio channels with variable parameters. In an embodiment, a digital implementation of the base-band receiver portion of RFID reader-interrogator provides coherent processing and decoding of 16-QAM encoded signals received from RFID tags.

Figure 1:
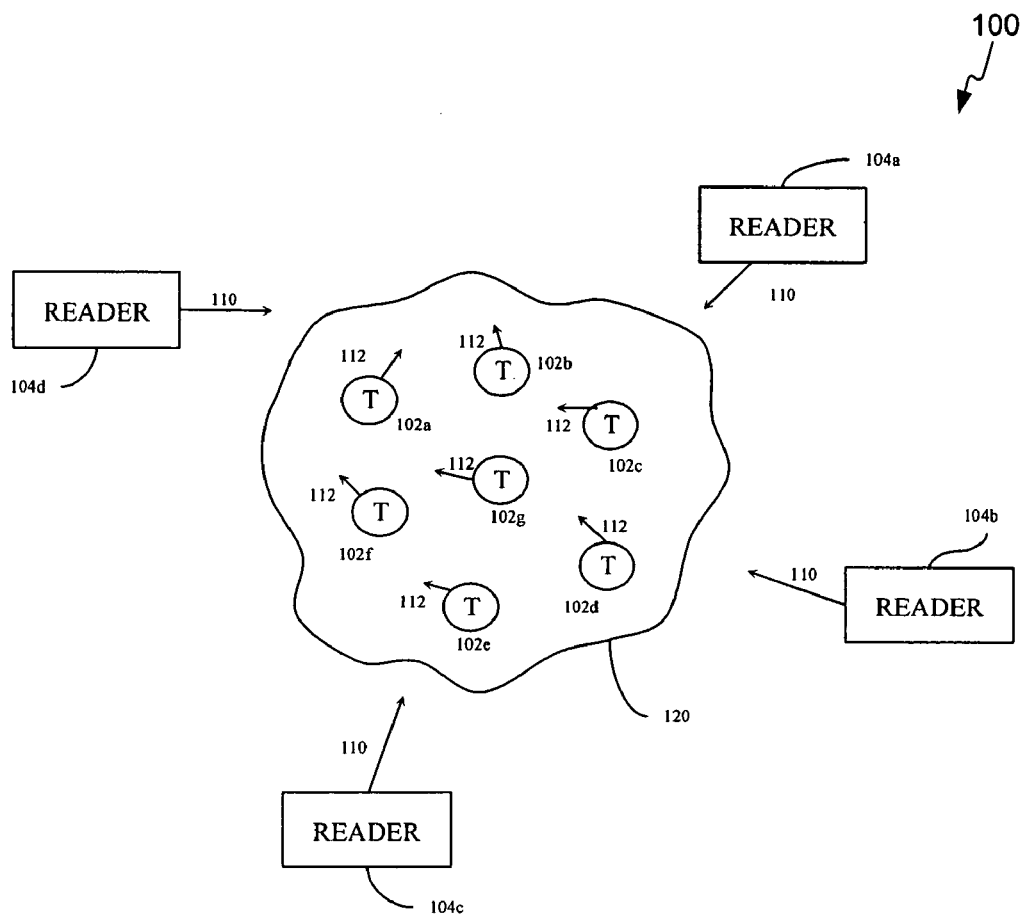
FIG. 1 illustrates an environment where RFID readers communicate with an exemplary population of RFID tags, according to an embodiment of the present invention.

FIG. 1 describes an example environment 100, where the present invention may be implemented. Environment 100 includes a population 120 of RFID tags 102a-g, and RFID readers 104a-d. Readers 104a-d may operate independently, or may be connected together to form a reader network. Although not shown explicitly in FIG. 1, each of readers 104a-d is coupled to one or more antennas. When a reader 104 transmits an interrogation signal 110 through its corresponding antenna, one or more tags 102 respond by sending a signal 112 back to the reader. Signal 112 contains tag identification data, that can be decoded by the interrogating reader 104 in order to retrieve relevant information about an item to which tag 102 is attached, such as item price, item location etc.

Embodiments of the present invention provide methods and apparatuses for demodulation and decoding of backscattered tag signals, represented by their in-phase and quadrature components in the receiver portion of a reader interrogator. It is noted that the receiver portion of the reader interrogator is often referred to as a "reader receiver" in the present application.

In a RFID system, once a reader interrogator receives a modulated response signal from a RFID tag, the reader performs a considerable amount of data processing to demodulate and decode the received signal. Various algorithms are used in the receiver as part of the decoding procedure.

Efficient decoding requires utilization of decision feedback. A decision feedback loop requires to provide linear transformations of the received signal for efficient averaging in noisy environment. A simple decision-making procedure based on comparing the received signals with fixed thresholds can considerably simplify decision circuitry. The present invention addresses these requirements.

The methods and systems described in the present application have several advantages compared to conventional data processing methods. Embodiments provide stable performance and reliable decision making even with a large variation of backscattered signal parameters. Embodiments of the present invention provide for both reliable data decoding and simple device implementation of the base-band portion of reader receivers.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

B. 16-QAM Constellation Located in Nodes of a Square Array

A constellation diagram is a representation of digital modulation in a complex plane. The real and imaginary axes on the complex plane are often called the in-phase or I-axis, and the quadrature-phase or Q-axis. The points on a constellation diagram are called constellation points. A constellation diagram allows a straightforward visualization of the modulation process. A received symbol can be placed as an arbitrary point in the I-Q plane and its decoded binary value is equated to the value of the constellation point that is closest to its location.

Figure 2:
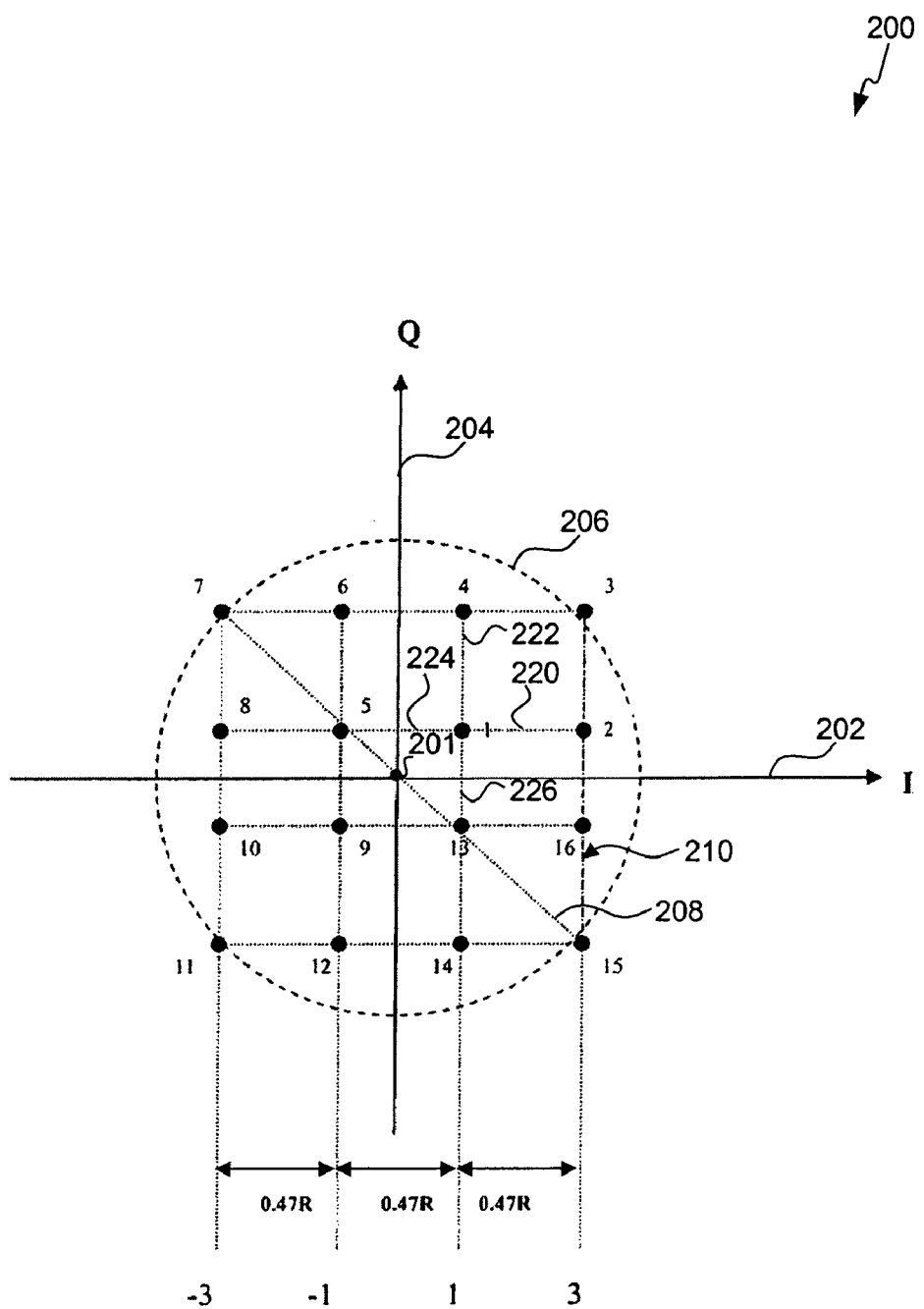
FIG. 2 shows an example 16-QAM constellation diagram, where the constellation points are located at the nodes of a square array.

An example 16-QAM constellation 200 located at the nodes of a square array 210 is shown in FIG. 2. In this case, bits are combined into groups of four. Thus, there are 16 possible binary values of a 4-bits/symbol 16-ary data signal corresponding to 16 constellation points with indices 1, 2, . . . , 16 in the signal space of the 16-QAM constellation diagram. The size of the 4×4 array is defined by the diagonal of the largest square, i.e. a diagonal 208 of a square array 210 is equal to the diameter 2R of the circumscribed circle 206. The power level of the constellation points is proportional to $R^2$. In FIG. 2, the points with indices 3, 7, 11, and 15 have the peak power.

The minimum distance $D_{min}$ between the points of the 16-QAM constellation 200 is equal to:

$$D_{min} = \sqrt{2} \ast R/3 \approx 0.47R$$

It is noted that an optimal 16-ary QAM constellation has a minimum distance of about 0.48R, as discussed in section 1.5 of the book titled "Phase and Phase-Difference Modulation in Digital Communications", by Yuri Okunev, which is incorporated herein by reference. Compared to that, it can be concluded that constellation 200 in FIG. 2 is very close to an optimal constellation. A square array constellation similar to constellation 200 provides the highest noise immunity to Additive White Gaussian Noise (AWGN) among all possible 16-ary QAM constellations with limited peak power.

Additional advantage of constellation 200 is that it has an optimal mapping code. Table I in FIG. 3 shows mapping codes for 16-QAM constellation 200 in FIG. 2. Column 1 of Table I lists constellation point indices, column 2 lists the corresponding mapping codes, and column 3 lists the indices of the nearest points from the constellation point listed in column 1.

Mapping codes of Table 1 satisfy the main requirement for an optimal mapping code, as discussed in the aforementioned reference book by Okunev. To satisfy the optimal mapping code requirement, two mapping codes, corresponding to two constellation points with the minimum distance 0.47R between them, should differ by only one digit. For example, the nearest constellation points from constellation point 1 (mapping code 1100) are points 2 (mapping code 1101), 4 (mapping code 1110), 5 (mapping code 1000), and 13 (mapping code 0100). Distance 220 between constellation points 1 and 4, distance 222 between constellation points 1 and 4, distance 224 between constellation points 1 and 5, and distance 226 between constellation points 1 and 13 are all equal to $D_{min}$. Each of the nearest points' mapping codes differ from 1100 by a single digit. As a result of the optimal mapping code, if a receiver makes a wrong decision in favor of an adjacent nearest point, only one of four digits of the decoded data will be erroneous.

The 16-QAM constellation 200 of FIG. 2 and mapping code of Table 1 (FIG. 3) serve as a basis for algorithms described below.

C. Example RFID Data Decoding Techniques and Receivers

Embodiments of the present invention provide for methods and apparatus for improved signal processing in RFID reader receivers over conventional techniques. Decision-feedback is used for tracking a signal phase and a signal amplitude in a radio channel with fast changing parameters. A simple decision-making procedure based on comparing the corrected received signals with fixed thresholds is implemented in embodiments.

As an implementation of the decoding methods, an adaptive reader receiver for a 16-QAM signal provides efficient tracking of signal parameters within a data session and coherently decodes the received signals. An RFID receiver provides for a linear transformation of a received high-frequency signal to base-band components I and Q. Note that the in-phase and quadrature components of a received encoded signal have a quadrature phase relationship (i.e., 90° out of phase) with respect to each other. Thus, both are referred as quadrature components of the received signal. For sake of differentiation and clarity, one of the components is referred to as an in-phase component (I), and the other component is referred to as a quadrature component (Q) herein.

I and Q have a quadrature phase relationship, and can be expressed as the real and imaginary components of a vector in a complex plane with a fixed coordinate system. Signal components I and Q are represented by their samples in case of a digital implementation.

Figure 4:
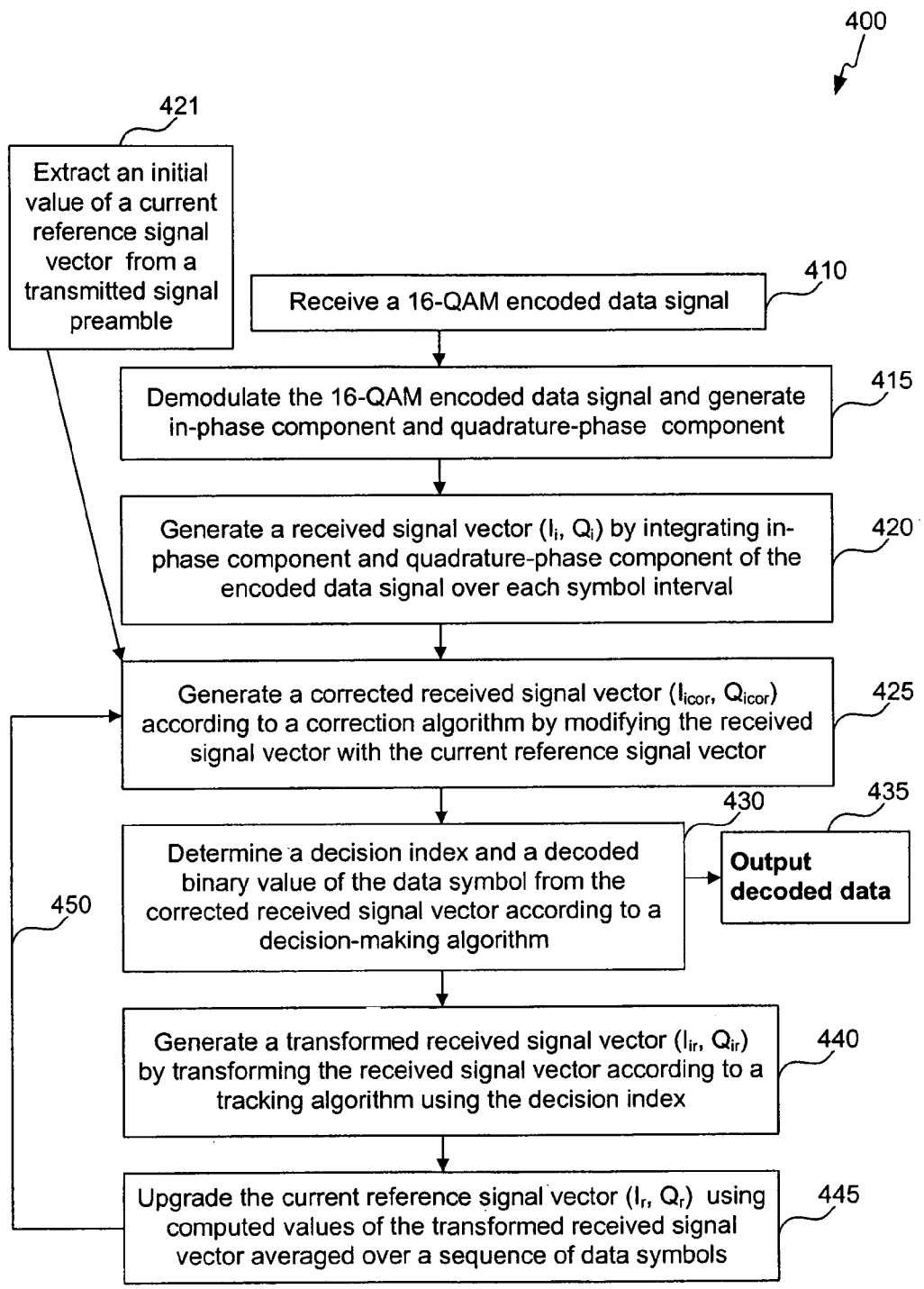
FIG. 4 shows a flowchart showing example steps of a 16-QAM decoding method, according to an embodiment of the present invention.

FIG. 4 shows flowchart 400 providing example steps of a signal processing method according to an embodiment of the present invention. The steps of flowchart 400 can be performed by embodiments of reader receivers described herein. Other structural and operational embodiments will be apparent to persons skilled in the relevant art(s) based on the following discussion related to flowchart 400. The steps shown in FIG. 4 do not necessarily have to occur in the order shown. The steps of flowchart 400 are performed by different functional modules described subsequently in greater detail in FIG. 6 in an example apparatus embodiment of the present invention.

In step 410, the receiver receives a 16-QAM encoded data signal. The data signal can be a backscattered data signal from an RFID tag following the transmission of a signal preamble. For example, reader RF front end 605 may perform step 410.

Figure 6:
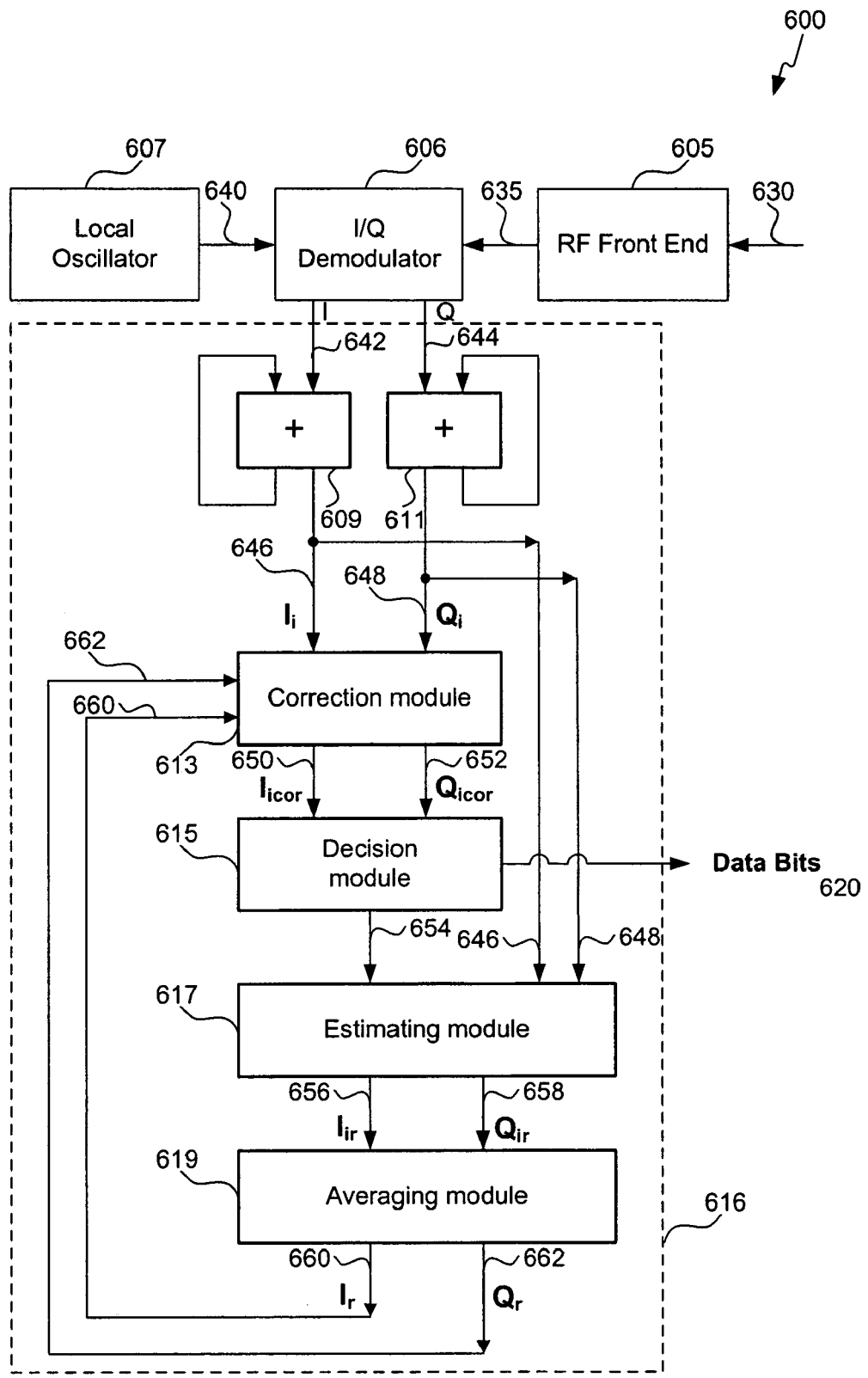
FIG. 6 shows a block diagram of a 16-QAM adaptive receiver, according to an embodiment of the present invention.

In step 415, the 16-QAM encoded data signal is demodulated and an in-phase component and a quadrature-phase component are generated. For example, I/Q demodulator 606 may perform step 415 using inputs from reader RF front end 605 and a local oscillator 607, as shown in FIG. 6.

In step 420, a received signal vector $(I_i, Q_i)$ is generated, wherein the received signal vector's coordinates $I_i$ and $Q_i$ represent the in-phase and quadrature-phase components, respectively, of the received encoded data signal. In a case of a digital implementation, $(I_i, Q_i)$ is generated by summing the samples of the in-phase component I and quadrature-phase component Q during each data symbol interval, and accumulating the results of the summations. In a case of an analog implementation, I and Q are integrated over the duration of each symbol interval. For example, adder-accumulators 609 and 611 may perform step 420.

In step 425, a corrected received signal vector $(I_{icor}, Q_{icor})$ is generated according to a correction algorithm by modifying the received signal vector $(I_i, Q_i)$ with the current reference signal vector $(I_r, Q_r)$. Equations 1a-1c show an example correction algorithm. For example, a correction module 613 may perform step 425.

Note that, an initial value of a reference signal vector $(I_r, Q_r)$ is extracted from a signal preamble, as shown in step 421. For instance, if the receiver is included in a RFID reader interrogator, then it can receive a backscattered data signal including a preamble from a RFID tag in response to an interrogation command issued by the interrogator. The preamble precedes actual data transmission. The subsequent data processing method utilizes reference signal vector $(I_r, Q_r)$, which gets constantly updated based on a decision feedback. However, the initial values of $I_r$ and $Q_r$ are extracted from the preamble. For example, reader RF front end 605 and I/Q demodulator 606 may perform step 421. Step 421 may be performed only once at the beginning of each data session.

In step 430, a decision index and a decoded binary value of the data symbol are determined from the corrected received signal vector according to a decision-making algorithm (such as an algorithm discussed later with regard to FIGS. 8 and 9). For example, a decision module 615 may perform step 430.

A decoded data symbol is outputted in step 435. It is noted that the outcome of step 435 is constantly updated by the results of a decision feedback loop 450.

In step 440, a transformed received signal vector $(I_{ir}, Q_{ir})$ is generated by transforming the received signal vector according to a tracking algorithm (e.g. as discussed with regard to FIG. 7) using the decision index computed in step 430. For example, an estimating module 617 may perform step 440.

In step 445, the coordinates of the current reference signal vector $(I_r, Q_r)$ is updated using computed values (according to equations 2a-2b) of the transformed received signal vector averaged over a sequence of data symbols. The updated coordinates are sent via feedback loop 450, so that the correction algorithm can use the most recent reference signal vector coordinates. For example, an averaging module 619 may perform step 445.

a. Example Conventional RFID Reader Embodiment

Figure 5:
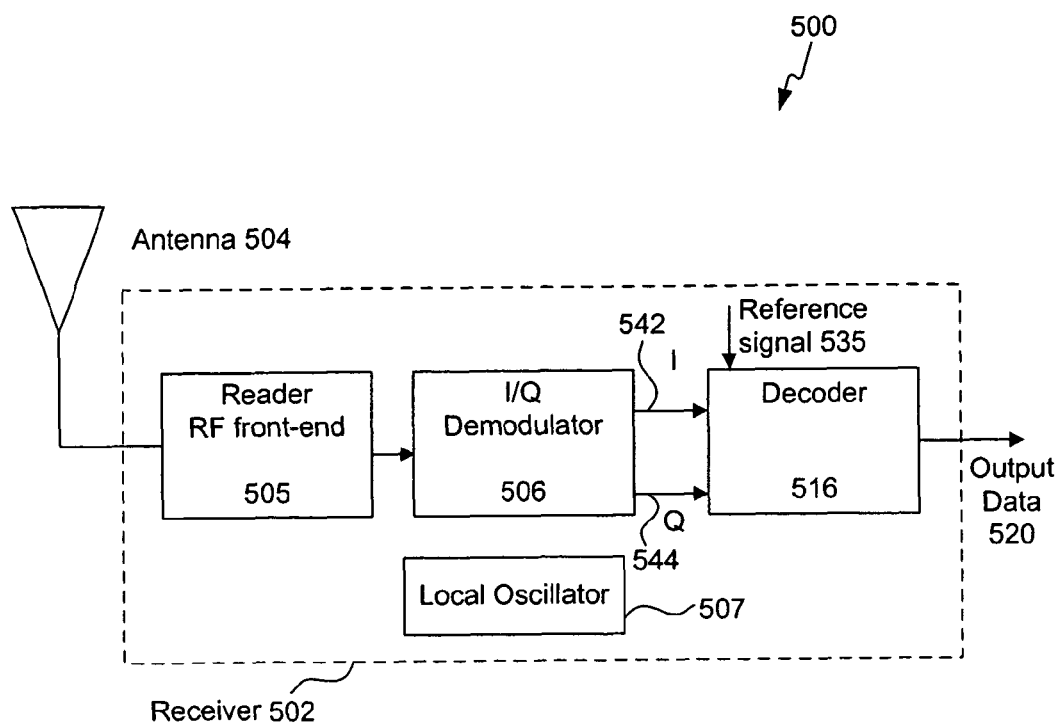
FIG. 5 shows a block diagram of the receiver portion of a conventional RFID reader interrogator.

FIG. 5 shows an example block diagram of the receiver portion of a conventional RFID reader interrogator 500, similar to reader 104 in FIG. 1. Reader interrogator 500 typically includes one or more antennas 504, one or more receivers 502, one or more transmitters, one or more memory units, and one or more processors (transmitters, memory units, and processors are not shown in FIG. 5). As shown in the example of FIG. 5, receiver 502 includes a RF front-end 505, an I/Q demodulator 506, a and a decoder 516. Receiver 502 may also include a local oscillator 507 coupled to the demodulator 506. These components of reader 500 may include software, hardware, and/or firmware, or any combination thereof, for performing their functions, which are described in further detail in subsequent sections herein.

Antenna 504 is used for communicating with tags 102 and/or other readers 104. RF front-end 505 typically includes one or more of antenna matching elements, amplifiers, filters, an echo-cancellation unit, and/or a down-converter. In an embodiment, RF front-end 505 receives the tag response signal through antenna 504 and down-converts the response signal to a frequency range amenable to further signal processing.

Demodulator 506 is coupled to an output of the RF front-end 505, and receives the modulated tag response signal from RF front-end 505. Demodulator 506 demodulates the tag response signal. At the output of demodulator 506, the tag response signal is represented by an in-phase component 542 (denoted as I), and a quadrature-phase component 544 (denoted as Q).

Decoder 516 is coupled to an output of demodulator 506 and receives in-phase and quadrature-phase components 542 and 544, respectively. Sub-components included within decoder 516 are further described below with reference to subsequent figures. Decoder 516 executes one or more algorithms in hardware and/or software in order to generate decoded data signal 520.

Signal 535 is a reference signal. Conventional reader receivers may receive reference signal parameters from a preamble, or generate and save multiple reference signals 535.

We now describe an example apparatus embodiment of the present invention, which has some components similar to the conventional reader in FIG. 5 with the addition of other functional modules in decoder 516 that carry out the different steps of the signal processing method taught by the present invention.

b. Example 16-QAM Adaptive Receiver

In an embodiment, the adaptive receiver of the present invention is based on coherent signal processing, which has been shown to provide a considerable energy gain compared to conventional non-coherent processing of multi-position QAM modulated signals. Coherent signal processing is based on carrier recovery by continuous phase and amplitude adjustment, including initial phase and amplitude estimation during the preamble, and phase and amplitude tracking during data transmission.

The initial phase and amplitude estimation is usually provided by measuring quadrature components of a reference signal, transmitted during the preamble. This procedure is called signal equalization, which is a procedure known to persons skilled in the relevant art(s). For the purpose of the present description, it is assumed that initialization of reference quadrature components is already done during preamble processing before the data transmission.

In an embodiment, the tracking method of the present invention relies on estimating and updating the quadrature components of the reference signal in the receiver. The tracking algorithm is based on a decision feedback.

The feedback-based decoding method of the present invention is based on transformation of a received signal into a vector of a fixed coordinate system. This transformation allows the base-band receiver to provide a simple decision making procedure without correction of constellation points.

FIG. 6 shows a block diagram of an example adaptive reader receiver 600 for carrying out the decoding and tracking method discussed in FIG. 4.

Receiver 600 includes the following main functional blocks: an RF front-end 605, an I/Q demodulator 606, a local oscillator 607, and a decoder 616. Decoder 616 has a first integrator 609, a second integrator 611, a correction module 613, a decision module 615, an estimating module 617, and an averaging module 619.

RF front-end 605 module is coupled to I/Q demodulator 606, and output signal 635 of RF front-end 605 is received by I/Q demodulator 606. I/Q demodulator 606 is also coupled to local oscillator 607, and output signal 640 of local oscillator 607 is received by I/Q demodulator 606. Output signal 642 of I/Q demodulator 606 is received by first integrator 609, and output signal 644 of I/Q demodulator 606 is received by second integrator 611.

Outputs of first and second integrators 609 and 611 are coupled to correction module 613. Correction module 613 receives signal 646 from first integrator 609, and signal 648 from second integrator 611. Signals 646 and 648 are also received by estimating module 617. Correction module 613 receives signals 662 and 660 from the output of averaging module 619.

Decision module 615 is coupled to the output of correction module 613. Decision module 615 receives output signals 650 and 652 from correction module 613. Decision module also outputs data bits 620.

Estimating module 617 is coupled to the output of decision module 615. Estimating module 617 receives output signal 654 from decision module 615 as well as signals 646 ($I_i$) and 648 ($Q_i$) from the outputs of integrators 609 and 611 respectively.

Averaging module 619 is coupled to the output of estimating module 617. Averaging module 615 receives output signals 656 and 658 from estimating module 617. As mentioned before, averaging module 619 outputs signals 660 and 662, which are received by correction module 613 through a feedback loop.

RF front-end 605 receives a preamble as well as modulated data signal 630 from RFID tags 102. Similar to FIG. 5, I/Q demodulator 606 receives an output signal 635 of the RF front-end 605. I/Q demodulator 606 is also coupled to local oscillator 607, which sends a signal 640 to demodulator 606, so that demodulator 606 demodulates and down-converts signal 635, based on the local oscillator carrier frequency. At the output of demodulator 606, the tag response signal is represented by an in-phase component 642 (denoted as I), and a quadrature-phase component 644 (denoted as Q) containing data symbols in parameters of local oscillator 607. I and Q components are represented in either an analog or a digital form depending on receiver implementation.

First integrator 609 receives and integrates in-phase component 642 over each symbol interval. A symbol interval is determined by a symbol synchronization unit not shown in FIG. 6. In a case of digital signal processing, where I/Q demodulator 606 has an analog-to-digital converter, integrator 609 may be substituted by an adder-accumulator which sums up the values of all the digital samples over each symbol and accumulates the result of the summations at the end of the i-th symbol interval. The adder-accumulator is represented in FIG. 6 as a summation unit with feedback. The result of the integration or accumulation is in-phase component $I_i$, denoted as signal 646, of the received signal vector ($I_i$, $Q_i$).

Second integrator 611 receives and integrates quadrature-phase component 644 over each symbol interval. In case of digital signal processing, integrator 611 may be an adder-accumulator which sums up the values of all the digital samples over each symbol interval and accumulates the result of the summations at the end of the i-th symbol interval. The result of the integration or accumulation is quadrature-phase component $Q_i$, denoted as signal 648, of the received signal vector ($I_i$, $Q_i$).

Correction module 613 is coupled to the outputs of integrators 609 and 611, and receives the received signal vector ($I_i$, $Q_i$), i.e. signal components 646 and 648. Correction module 613 also receives a reference signal vector ($I_r$, $Q_r$), denoted by signal components 662 and 660 from averaging module 619. As mentioned earlier, ($I_r$, $Q_r$) is initially estimated from the preamble, and then updated based on decision feedback.

Correction Algorithm

Correction module 613 corrects received signal vector ($I_r$, $Q_r$) according to a correction algorithm shown below in equations 1a-1c, modifying the received signal vector coordinates with the reference signal vector coordinates to generate a corrected received signal vector ($I_{icor}$, $Q_{icor}$) denoted by signals 650 and 652.

The correction algorithm is mathematically represented as algorithm (1), according to the equations:

$$I_{icor}=(Q_iQ_r+I_iI_r)/A^2, \quad (1a)$$

$$Q_{icor}=(Q_iI_r-I_iQ_r)/A^2, \quad (1b)$$

$$A^2=(I_r)^2+(Q_r)^2. \quad (1c)$$

Algorithm (1) is based on a utilization of existing estimates of the reference signal $I_r$, $Q_r$. At the very beginning of data transmission the correction algorithm uses the estimates of the reference signal ($I_r$, $Q_r$) received from the preamble. During the data transmission, updated estimates $I_r$, $Q_r$ are received by correction module 613 from the output of averaging module 619, as shown in FIG. 6.

It should be noted that, if estimates ($I_r$, $Q_r$) are correct, algorithm (1) transforms the received vector ($I_i$, $Q_i$) into a vector having one of the initial fixed coordinates shown in the constellation 200 in FIG. 2, where the new corrected vector has coordinates ($I_{icor}$, $Q_{icor}$). It is desired to calculate ($I_{icor}$, $Q_{icor}$) without having to change the constellation point coordinates using a decision-making procedure.

Decision Algorithm

Components of the corrected received vector ($I_{icor}$, $Q_{icor}$), i.e. signals 650 and 652 are received by decision module 615. There are different decision algorithms that can be used in decode the binary values of the received symbols, as will be appreciated by persons skilled in the relevant art(s). For illustrative purposes, we have discussed in detail an algorithm based on comparison of the $I_{icor}$, and $Q_{icor}$ components with a limited number of predetermined thresholds. Decision module 615 may be configured to carry out alternative algorithms as well.

Figure 8:
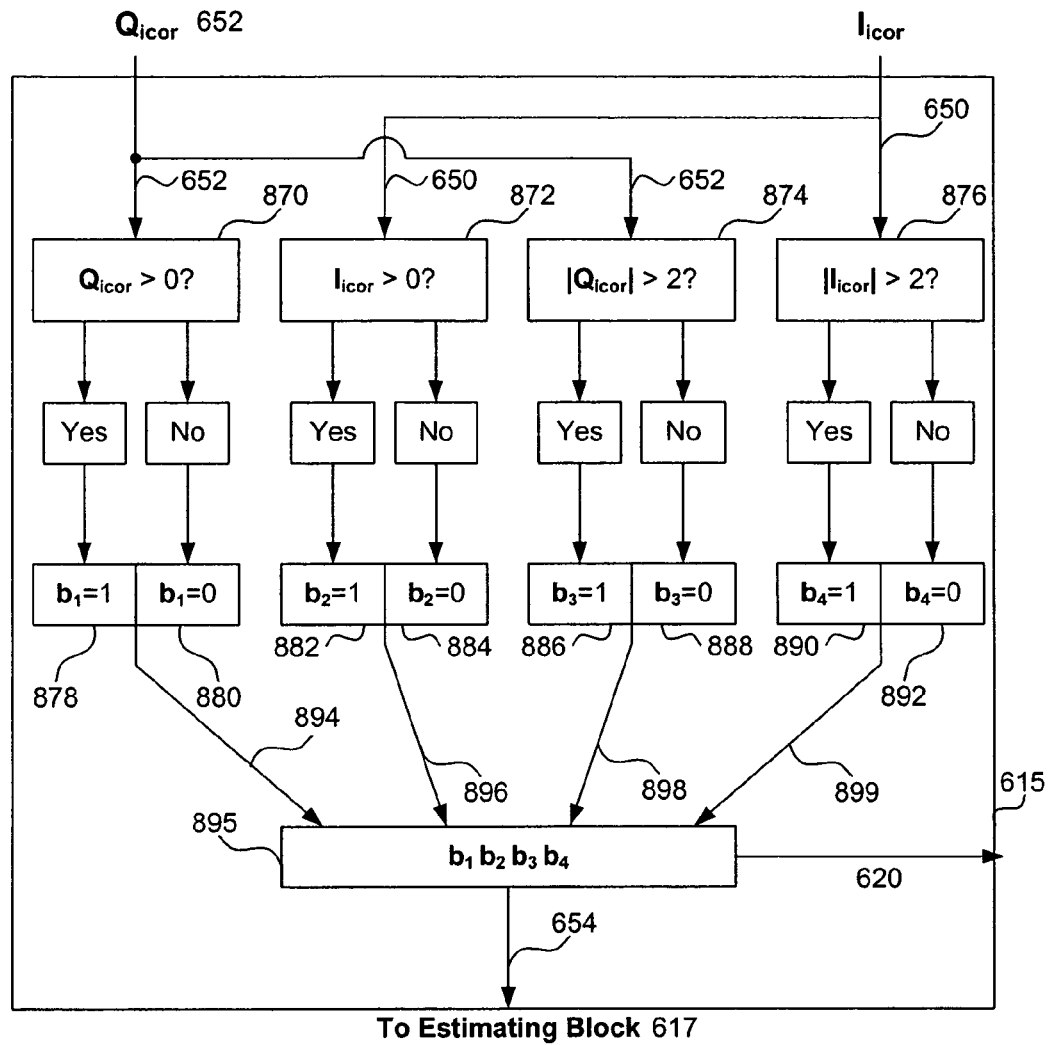
FIG. 8 shows a block diagram of a decision-making module, according to an embodiment of the present invention.

An example decision-making algorithm is illustrated in FIGS. 7 and 8. The algorithm is developed for the 16-QAM constellation 200 of FIG. 2. The algorithm is based on comparing real and imaginary components $I_{icor}$ and $Q_{icor}$ of the corrected received vector ($I_{icor}$, $Q_{icor}$) with two predetermined thresholds: zero and 2.

Table II in FIG. 7 describes this decision-making algorithm.

The first column of Table II lists the decision indices of the constellation points from 1 to 16. Each decision index is the result of the combined information obtained from columns 3-6 of Table II.

The second column of Table II lists the mapping codes containing 4-digit binary data '$b_1b_2b_3b_4$' corresponding to the constellation points.

The third column lists the signs (positive or negative) of $Q_{icor}$. Values listed in the third column may also be interpreted as the results of comparing $Q_{icor}$ with a zero threshold.

The fourth column lists the signs (positive or negative) of $I_{icor}$. Values listed in the fourth column may also be interpreted as the results of comparing $I_{icor}$ with a zero threshold.

The fifth column lists the results (yes or no) of comparing $Q_{icor}$ with a predetermined threshold, for example, a threshold of 2.

The sixth column lists the results (yes or no) of comparing $I_{icor}$ with a predetermined threshold, for example, a threshold of 2.

Results of comparing $I_{icor}$ and $Q_{icor}$ with thresholds 0 and 2 completely determines the decision index as well as the corresponding binary value. It is noted that from columns 3-6, one can directly determine the individual digits of the decoded binary data '$b_1b_2b_3b_4$'.

For example, it is noted that signs of $Q_{icor}$ (the third column) correspond to the first digit $b_1$ in the second column (a sign of "+" corresponds to 1, and a sign of "−" corresponds to 0). Similarly, signs of $I_{icor}$ (the fourth column) correspond to the second digit $b_2$ in the second column (a sign of "+" corresponds to 1, and a sign of "−" corresponds to 0). Additionally, results of comparing $Q_{icor}$ with threshold 2 (the fifth column) correspond to the third digit $b_3$ in the second column (assuming 'Yes' corresponds to 1, and 'No' corresponds to 0), and results of comparing $I_{icor}$ with threshold 2 (the sixth column) correspond to the fourth digit $b_4$ in the second column (assuming 'Yes' corresponds to 1, and 'No' corresponds to 0).

FIG. 8 is an expanded block diagram of decision module 614 showing the scheme of operation described in FIG. 7. Decision module 615 has a first comparing block 870, a second comparing block 872, a third comparing block 874, a fourth comparing block 876, a first value assigning block 878, a second value assigning block 880, a third value assigning block 882, a fourth value assigning block 884, a fifth value assigning block 886, a sixth value assigning block 888, a seventh value assigning block 890, an eighth value assigning block 892, and an output block 895. First and second value assigning blocks 878 and 880 are coupled to the output of first comparison block 870, third and fourth value assigning blocks 882 and 884 are coupled to the output of second comparison block 872, fifth and sixth value assigning blocks 886 and 888 are coupled to the output of third comparison block 874, and seventh and eighth value assigning blocks 890 and 892 are coupled to the output of fourth comparison block 872.

First comparing block 870 and third comparing block 874 receive signal 652 ($Q_{icor}$), and second comparing block 872 and fourth comparing block 876 receive signal 650 ($I_{cor}$) from correction module 613.

First comparing block 970 performs the logical operation, '$Q_{icor}>0$?'. In other words, it compares $Q_{icor}$ with a zero threshold to determine a sign. If the result of the comparison is 'Yes', i.e. sign of $Q_{icor}$ is positive (shown in column 3 of Table II in FIG. 7), then first value assigning block 878 assigns a binary value of '1' to the first digit $b_1$ of the symbol. If the result of the comparison is 'No', i.e. sign of $Q_{icor}$ is negative (shown in column 3 of Table II in FIG. 7), then second value assigning block 880 assigns a binary value of '0' to the first digit of the symbol.

Similarly, the second digit $b_2$ of the symbol is assigned a value of either 1 or 0 depending on the result of logical operation '$I_{icor}>0$?' performed by second comparison block 872.

Third comparing block 874 performs the logical operation, $|Q_{icor}|>2$. In other words, it compares the absolute value of $Q_{icor}$ with a threshold 2. If the result of the comparison is 'Yes', (shown in column 5 of Table II in FIG. 7), then fifth value assigning block 886 assigns a binary value of '1' to the third digit $b_3$ of the symbol. If the result of the comparison is 'No', (shown in column 3 of Table II in FIG. 7), then sixth value assigning block 888 assigns a binary value of '0' to the third digit of the symbol.

Similarly, the fourth digit $b_4$ of the symbol is assigned a value of either 1 or 0 depending on the result of logical operation $|I_{icor}|>2$ performed by fourth comparison block 876.

A combination of the received "Yes" and "No" comparison results completely determines the transmitted binary symbol $b_1b_2b_3b_4$, and is received as signals 894, 896, 898, and 899 by output block 895. Decoded value $b_1b_2b_3b_4$ is then outputted as decoded data bits 620 by output block 895. For example, if, $Q_{icor}<0$, $I_{icor}>0$, $|Q_{icor}|>2$, and $|I_{icor}|<2$, then $b_1b_2b_3b_4=0110$.

Decoded value $b_1b_2b_3b_4$ is directly outputted as current data bits, and is also used determine a decision index 654 that is sent to estimating module 617 to support the tracking procedure taking place there.

Tracking and Averaging Algorithm

Going back to FIG. 6, estimating module 617 receives the current decision index 654 for each decoded symbol, which is equal to a constellation point index listed on column 1 of Table II in FIG. 7. Estimation module 617 also receives current received signal vector $(I_i, Q_i)$, and transforms it to generate a transformed received signal vector $(I_{ir}, Q_{ir})$ according to a tracking algorithm using decision index 654.

The tracking algorithm is presented as Table III in FIG. 9.

The first column of Table III indicates decision indices 654 provided by decision module 615, and the second and third columns of Table III show desired $I_{ir}$ and $Q_{ir}$ components as linear combinations of $I_i$ and $Q_i$. For example, decision index 10 corresponds to $I_{ir}=-0.1Q_i-0.3I_i$, and $Q_{ir}=0.1I_i-0.3Q_i$.

Estimating module 617 outputs signals 656 and 658 representing $I_{ir}$ and $Q_{ir}$ respectively, which are received by averaging module 619. Averaging module 619 averages $I_{ir}$ and $Q_{ir}$ for a sequence of N symbols, according to:

$$I_r(i) = (1/N) \sum_{j=i-N}^{i} I_{jr} \quad (2a)$$

$$Q_r(i) = (1/N) \sum_{j=i-N}^{i} Q_{jr} \quad (2b)$$

Here, summations are performed over a predetermined sequence of 'N' number of data symbols immediately preceding the to-be-determined (i+1)-th data symbol, the sequence of data symbols having indices j=i−N, i−(N−1), i−(N−2), . . . , i.

Values of $I_r(i)$ and $Q_r(i)$ from equation 2a-2b are estimates of I and Q components of the updated reference signal vector used as the basis for carrier phase and amplitude tracking.

It should be noted that averaging procedure described by equation 2a-2b can be realized in different ways.

For example, a first procedure is the conventional averaging with a sliding window. In this case the estimates $I_r(i)$ and $Q_r(i)$ are calculated for each symbol by averaging N preceding symbols. This approach guarantees the most accurate phase correction, but it requires considerable processing resource and memory.

A second procedure is to implement equations 2a-2b by averaging over a block of N symbols. In this case the estimates $I_r(i)$ and $Q_r(i)$ are calculated for each block of N symbols, and phase correction is provided once per N-symbol block. The later procedure needs very small memory and requires the minimum processing resource.

It should be also noted that if all decisions participating in averaging procedure are correct, then $I_r$ and $Q_r$ are the optimal estimates, i.e. they are unbiased and effective in terms of the minimum variance.

Components of the reference vector $(I_r, Q_r)$, i.e. signals 660 and 662 outputted by averaging module 619, are then received by correction module 613 as the correcting parameters for decoding the next, i.e. (i+1)-th symbol, as shown in FIG. 6.

It should be noted that each received signal vector $(I_i, Q_i)$ is corrected according to equations 1a-1c, but the correcting parameters $I_r$, $Q_r$ may be changed in different time intervals ranging from one symbol interval to N symbol intervals, depending on the closen method of signal averaging. Typically, correcting parameters change at a rate slower than data modulation rate. During several symbol intervals the received signal is corrected with the same correcting parameters $I_r$, $Q_r$, thus simplifying the receiver implementation.

Conclusions

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. In a base-band receiver, a method for coherently tracking and decoding a received 16-QAM encoded data signal comprising a plurality of data symbols, the method comprising:
   (a) demodulating the received 16-QAM encoded data signal to generate an in-phase component and a quadrature-phase component of the encoded data signal;
   (b) integrating the in-phase component during each data symbol interval;
   (c) integrating the quadrature-phase component during each data symbol interval;
   (d) combining results of the integrations in (b) and (c) to generate a received signal vector, wherein coordinates of the received signal vector represent the in-phase and quadrature-phase component, respectively, of the received encoded 16-QAM data signal;
   (e) correcting the received signal vector according to a correction algorithm by modifying the coordinates of the received signal vector with coordinates of a current reference signal vector to generate a corrected received signal vector;
   (f) determining a decision index and a decoded binary value for each of the plurality of data symbols corresponding to one of 16 constellation points arranged in a 4×4 square array in a constellation diagram with 16 predetermined states, according to a decision-making algorithm using the corrected received signal vector;
   (g) transforming the received signal vector according to a tracking algorithm using the decision index to generate a transformed received signal vector; and
   (h) updating the coordinates of the current reference signal vector using computed values of the transformed received signal vector averaged over a predetermined sequence of data symbols.

2. The method of claim 1 further comprising:
   repeating (a)-(h) using the updated coordinates of the reference signal vector.

3. The method of claim 1, wherein in (e), the coordinates $I_{icor}$ and $Q_{icor}$ of the corrected received signal vector $(I_{icor}, Q_{icor})$ are generated according to the following correction algorithm:

$$I_{icor}=(Q_iQ_r+I_iI_r)/A^2,$$

$$Q_{icor}=(Q_iI_r-I_iQ_r)/A^2,$$

where, $$A^2=(I_r)^2+(Q_r)^2;$$

($I_i$, $Q_i$) is the received signal vector with coordinates $I_i$ and $Q_i$ respectively representing the in-phase and quadrature-phase components of the encoded data signal; and ($I_r$, $Q_r$) is the current reference signal vector with coordinates $I_r$ and $Q_r$.

4. The method of claim 3, wherein in (f), the decision-making algorithm comprises:
  (i) generating a first digit '$b_1$' of the data symbol based on a sign of either $Q_{icor}$ or $I_{icor}$ of the corrected received signal vector;
  (j) generating a second digit '$b_2$' of the data symbol based on a sign of a complementary component of the corrected received signal vector;
  (k) generating a third digit '$b_3$' of the data symbol based on an absolute value of either $Q_{icor}$ or $I_{icor}$ of the corrected received signal vector relative to a predetermined threshold value; and
  (l) generating a fourth digit '$b_4$' of the data symbol based on an absolute value of a complementary component of the corrected received signal vector relative to the predetermined threshold value.

5. The method of claim 3, wherein in (g), the tracking algorithm comprises:
  expressing desired values of coordinates $I_{ir}$ and $Q_{ir}$ of the transformed received signal vector ($I_{ir}$, $Q_{ir}$) as linear combinations of $I_i$ and $Q_i$, each desired value corresponding to a decision index determined in (f).

6. The method of claim 5, wherein in (h), averaged values $I_r(i)$ and $Q_r(i)$ of the components of the transformed received signal vector ($I_{ir}$, $Q_{ir}$) are computed according to, $$I_r(i) = (1/N) \sum_{j=i-N}^{i} I_{jr},$$

$$Q_r(i) = (1/N) \sum_{j=i-N}^{i} Q_{jr};$$

where summations are performed over a predetermined sequence of 'N' number of data symbols immediately preceding the (i+1)-th data symbol, the sequence of data symbols having indices j=i−N, i−(N−1), i−(N−2),...,i.

7. The method of claim 6, wherein the computed values of $I_r(i)$ and $Q_r(i)$ are used as the updated coordinates of the current reference signal vector.

8. The method of claim 6, wherein a phase correction is provided once per data symbol by calculating $I_r(i)$ and $Q_r(i)$ for N symbols preceding the current symbol.

9. The method of claim 6, wherein a phase correction is provided once per N data symbols by calculating $I_r(i)$ and $Q_r(i)$ for the N symbols.

10. The method of claim 1, wherein in (e), initial coordinates of the current reference signal vector are estimated by measuring an in-phase and a quadrature-phase components of a reference signal transmitted during a preamble prior to receiving the data symbols.

11. The method of claim 1, wherein the encoded data signal comprises data from a backscattered signal received from a RFID tag.

12. The method of claim 1, wherein in (f), the decision indices are determined in a way such that the decoded binary values of two data symbols having decision indices corresponding to two constellation points separated by a minimum distance in the constellation diagram differ by a single digit.

13. The method of claim 1, wherein the method is a digital decoding method, and wherein the integration processes in (b) and (c) are accumulation processes performed during each data symbol interval.

14. A base-band receiver configured to coherently track and decode a 16-QAM encoded data signal comprising a plurality of data symbols, the receiver comprising:
  a local oscillator that locally alters a frequency of the encoded data signal for subsequent processing;
  a demodulator that demodulates the encoded data signal into an in-phase component and a quadrature-phase component;
  a first integrator that receives the in-phase component of the encoded data signal and generates a real coordinate of a received signal vector by integrating the in-phase component during a data symbol interval;
  a second integrator that receives the quadrature-phase component of the encoded data signal and generates an imaginary coordinate of the received signal vector by integrating the quadrature-phase component during the data symbol interval;
  a correction module that receives the received signal vector and a reference signal vector, and corrects the received signal vector according to a correction algorithm modifying the coordinates of the received signal vector with coordinates of a reference signal vector to generate a corrected received signal vector;
  a decision module that receives the corrected received signal vector and determines a decision index and a decoded binary value for each data symbol corresponding to one of 16 constellation points arranged in a 4×4 square array in a constellation diagram with 16 predetermined states, according to a decision-making algorithm using the corrected received signal vector;
  an estimating module that receives the received signal vector and the decision index determined by the decision module, and transforms the received signal vector according to a tracking algorithm using the decision index to generate a transformed received signal vector; and
  an averaging module that receives the transformed received signal vector and outputs an updated reference signal vector by updating the coordinates of the current reference signal vector using computed values of the transformed received signal vector averaged over a predetermined sequence of data symbols.

15. The receiver of claim 14, wherein the receiver is included in a RFID reader interrogator device.

16. The receiver of claim 15, wherein the receiver further comprises:
  a radio frequency (RF) front end coupled to an antenna.

17. The receiver of claim 15, wherein the encoded data signal comprises data from a backscattered signal received from a RFID tag.

18. The receiver of claim 14, wherein the first integrator is a digital adder-accumulator which receives samples of the in-phase component of the encoded data signal, performs summation over each data symbol interval, and accumulates results of the summation to generate the real component of the received signal vector.

19. The receiver of claim 14, wherein the second integrator is a digital adder-accumulator which receives samples of the quadrature-phase component of the encoded signal, performs summation over each data symbol interval, and accumulates results of the summation to generate the imaginary component of the received signal vector.

20. The receiver of claim 14, wherein the correction module generates coordinates $I_{icor}$ and $Q_{icor}$ of the corrected received signal vector $(I_{icor}, Q_{icor})$ according to the following correction algorithm:

$$I_{icor}=(Q_iQ_r+I_iI_r)/A^2,$$

$$Q_{icor}=(Q_iI_r-I_iQ_r)/A^2,$$

where, $$A^2=(I_r)^2+(Q_r)^2;$$

$(I_i, Q_i)$ is the received signal vector with coordinates $I_i$ and $Q_i$ representing the in-phase and quadrature-phase components of the received signal respectively, and $(I_r, Q_r)$ is the current reference signal vector with coordinates $I_r$ and $Q_r$.

21. The receiver of claim 20, wherein the decision module generates a first digit 'b$_1$' of the data symbol based on a sign of either $Q_{icor}$ or $I_{icor}$ of the corrected received signal vector; generates a second digit 'b$_2$' of the data symbol based on a sign of a complementary component of the corrected received signal vector; generates a third digit 'b$_3$' of the data symbol based on an absolute value of either $Q_{icor}$ or $I_{icor}$ of the corrected received signal vector relative to a predetermined threshold value; and generates a fourth digit 'b$_4$' of the data symbol based on an absolute value of a complementary component of the corrected received signal vector relative to the predetermined threshold value.

22. The receiver of claim 20, wherein the estimating module expresses desired values of coordinates $I_{ir}$ and $Q_{ir}$ of the transformed received signal vector $(I_{ir}, Q_{ir})$ as linear combinations of $I_i$ and $Q_i$, each desired value corresponding to the decision index determined by the decision module.

23. The receiver of claim 22, wherein the averaging module computes averaged values $I_r(i)$ and $Q_r(i)$ of the components of the transformed received signal vector $(I_{ir}, Q_{ir})$ according to, $$I_r(i) = (1/N) \sum_{j=i-N}^{i} I_{jr},$$

$$Q_r(i) = (1/N) \sum_{j=i-N}^{i} Q_{jr},$$

where summations are performed over a predetermined sequence of 'N' number of data symbols immediately preceding the (i+1)-th data symbol, the sequence of data symbols having indices j=i−N, i−(N−1), i−(N−2),...,i.

24. The receiver of claim 23, wherein the averaging module sends $I_r(i)$ and $Q_r(i)$ to the correction module as the updated coordinates of the current reference signal vector.

25. In a base-band receiver, a method for coherently tracking and decoding a m-QAM encoded data signal comprising a plurality of data symbols, wherein the encoded data signal is demodulated into an in-phase component and a quadrature-phase component, the tracking and decoding method comprising:

integrating the in-phase component and the quadrature-phase component during each data symbol interval;

combining results of the in-phase component integration and the quadrature-phase component integration to generate a received signal vector, wherein coordinates of the received signal vector represent the in-phase and quadrature-phase component, respectively, of the received encoded m-QAM data signal;

correcting the received signal vector according to a correction algorithm by modifying the coordinates of the received signal vector with coordinates of a current reference signal vector to generate a corrected received signal vector;

determining a decision index and a decoded binary value for each of the plurality of data symbols corresponding to one of m constellation points arranged in a n by n square array in a constellation diagram with m predetermined states, according to a decision-making algorithm using the corrected received signal vector;

transforming the received signal vector according to a tracking algorithm using the decision index to generate a transformed received signal vector; and updating the coordinates of the current reference signal vector using computed values of the transformed received signal vector averaged over a predetermined sequence of data symbols.

26. A base-band receiver configured to coherently track and decode a m-QAM encoded data signal comprising a plurality of data symbols, wherein the encoded data signal is demodulated into an in-phase component and a quadrature-phase component, the receiver comprising:

a first integrator that receives the in-phase component of the encoded data signal and generates a real coordinate of a received signal vector by integrating the in-phase component during a data symbol interval;

a second integrator that receives the quadrature-phase component of the encoded data signal and generates an imaginary coordinate of the received signal vector by integrating the quadrature-phase component during the data symbol interval;

a correction module that receives the received signal vector and a reference signal vector, and corrects the received signal vector according to a correction algorithm modifying the coordinates of the received signal vector with coordinates of a reference signal vector to generate a corrected received signal vector;

a decision module that receives the corrected received signal vector and determines a decision index and a decoded binary value for each data symbol corresponding to one of m constellation points arranged in a n by n square array in a constellation diagram with m predetermined states, according to a decision-making algorithm using the corrected received signal vector;

an estimating module that receives the received signal vector and the decision index determined by the decision module, and transforms the received signal vector according to a tracking algorithm using the decision index to generate a transformed received signal vector; and an averaging module that receives the transformed received signal vector and outputs an updated reference signal vector by updating the coordinates of the current reference signal vector using computed values of the transformed received signal vector averaged over a predetermined sequence of data symbols.

27. In a base-band receiver, a system for coherently tracking and decoding a m-QAM encoded data signal comprising a plurality of data symbols, wherein the encoded data signal is demodulated into an in-phase component and a quadrature-phase component, the tracking and decoding system comprising:

means for integrating the in-phase component and the quadrature-phase component during each data symbol interval;

means for combining results of the in-phase component integration and quadrature-phase component integration to generate a received signal vector, wherein coordinates of the received signal vector represent the in-phase and quadrature-phase component, respectively, of the received encoded m-QAM data signal;

means for correcting the received signal vector according to a correction algorithm by modifying the coordinates of the received signal vector with coordinates of a current reference signal vector to generate a corrected received signal vector;

means for determining a decision index and a decoded binary value for each of the plurality of data symbols corresponding to one of m constellation points arranged in a n by n square array in a constellation diagram with m predetermined states, according to a decision-making algorithm using the corrected received signal vector;

means for transforming the received signal vector according to a tracking algorithm using the decision index to generate a transformed received signal vector; and means for updating the coordinates of the current reference signal vector using computed values of the transformed received signal vector averaged over a predetermined sequence of data symbols.

\* \* \* \* \*

UNITED STATES PATENT AND TRADEMARK OFFICE
CERTIFICATE OF CORRECTION

| | | |
|---|---|---|
| PATENT NO. | : 7,929,630 B2 | Page 1 of 1 |
| APPLICATION NO. | : 11/518212 | |
| DATED | : April 19, 2011 | |
| INVENTOR(S) | : Okunev | |

It is certified that error appears in the above-identified patent and that said Letters Patent is hereby corrected as shown below:

In Column 2, Line 24, delete "adopted In" and insert -- adopted. In --, therefor.

In Column 10, Line 35, delete "(Icor)" and insert -- (licor) --, therefor.

In Column 12, Line 5, delete "closen" and insert -- close --, therefor.

Signed and Sealed this
First Day of January, 2013

David J. Kappos
*Director of the United States Patent and Trademark Office*